(12) United States Patent
Miller et al.

(10) Patent No.: US 8,440,302 B2
(45) Date of Patent: *May 14, 2013

(54) REINFORCED RESIN-DERIVED CARBON FOAM

(75) Inventors: Douglas J. Miller, North Olmsted, OH (US); Irwin C. Lewis, Strongsville, OH (US); Richard L. Shao, North Royalton, OH (US); Mehmet Suha Yazici, Parma Heights, OH (US)

(73) Assignee: GrafTech International Holdings Inc., Parma, OH (US)

( * ) Notice: Subject to any disclaimer, the term of this patent is extended or adjusted under 35 U.S.C. 154(b) by 166 days.

This patent is subject to a terminal disclaimer.

(21) Appl. No.: 12/796,526

(22) Filed: Jun. 8, 2010

(65) Prior Publication Data

US 2010/0308280 A1    Dec. 9, 2010

Related U.S. Application Data

(62) Division of application No. 11/321,739, filed on Dec. 29, 2005, now Pat. No. 7,758,779.

(51) Int. Cl.
    *B32B 9/00* (2006.01)
(52) U.S. Cl.
    USPC .......................................................... 428/408
(58) Field of Classification Search .................. 428/408; 423/447.1, 447.2, 448
    See application file for complete search history.

(56) References Cited

U.S. PATENT DOCUMENTS

| 3,302,999 | A |   | 2/1967 | Mitchell |
| 3,342,555 | A | * | 9/1967 | McMillan ................ 423/445 R |
| 4,595,623 | A | * | 6/1986 | Du Pont et al. ............ 428/195.1 |
| 5,888,469 | A |   | 3/1999 | Stiller et al. |
| 5,945,084 | A |   | 8/1999 | Droege |
| 6,033,506 | A |   | 3/2000 | Klett |
| 6,103,149 | A |   | 8/2000 | Stankiewicz |
| 6,776,936 | B2 |  | 8/2004 | Hardcastle et al. |

OTHER PUBLICATIONS

Anderson et al., "Microcellular Pitch-Based Carbon Foams Blown With Helium Gas," Proceedings of the 43rd International SAMPE Meeting, p. 759 (1998).
Mercuri et al., "Modifications of Phenolic Precursor Carbon Foam," Proceedings of the 9th Carbon Conference, p. 206 (1969).
Rogers et al., "Low-Cost Carbon Foams for Thermal Protection and Reinforcement Applications," Proceedings of the 45th SAMPE Conference, Long Beaach, CA, May 21-25, 2000, pp. 295-305.

* cited by examiner

*Primary Examiner* — Maria Veronica Ewald
*Assistant Examiner* — Daniel H Miller

(57) ABSTRACT

A reinforced carbon foam material is formed from carbon fibers incorporated within a carbon foam's structure. First, carbon fiber bundles are combined with a liquid resol resin. The carbon fiber bundles separate into individual carbon fiber filaments and disperse throughout the liquid resol resin. Second, the carbon fiber resin mixture is foamed thus fixing the carbon fibers in a permanent spatial arrangement within the phenolic foam. The foam is then carbonized to create a carbon fiber reinforced foam with improved graphitic characteristics as well as increased strength. Optionally, various additives can be introduced simultaneously with the addition of the carbon fiber bundles into the liquid resol, which can improve the graphitic nature of the final carbon foam material and/or increase the foam's resistance to oxidation.

8 Claims, No Drawings

REINFORCED RESIN-DERIVED CARBON FOAM

BACKGROUND OF THE INVENTION

1. Technical Field

The present invention relates to reinforced resin-derived carbon foams useful for high temperature and/or high strength applications, such as composite tooling; electrodes; thermal insulation; core material used in sandwich structures; impact and sound absorption; and high-temperature furnace insulation and construction. More particularly, the present invention relates to carbon fiber reinforced carbon foams exhibiting superior graphitic strength, weight and density characteristics. The invention also includes methods for the production of such carbon foams.

2. Background Art

Carbon foams have attracted considerable recent activity because of their properties of low density, coupled with either very high or low thermal conductivity. Conventionally, carbon foams are prepared via two general routes. Highly graphitizable foams have been produced by thermal treatment of mesophase pitches under high pressure. These foams tend to have high thermal and electrical conductivities. For example, in Klett, U.S. Pat. No. 6,033,506, mesophase pitch is heated while subjected to a pressure of 1000 psi to produce an open-cell foam containing interconnected cells with a size range of 90-200 microns. According to Klett, after heat treatment to 2800° C., the solid portion of the foam develops into a highly crystalline graphitic structure with an interlayer spacing of 0.366 nm. The foam is asserted to have compressive strengths greater than previous foams (3.4 MPa or 500 psi for a density of 0.53 g/cm$^3$).

In Hardcastle et al. (U.S. Pat. No. 6,776,936), carbon foams with densities ranging from 0.68-1.5 g/cm$^3$ are produced by heating a pitch in a mold at pressures up to 800 psi. The foam is alleged to be highly graphitizable and provide high thermal conductivity (250 W/m° K).

According to H. J. Anderson et al. in Proceedings of the 43rd International SAMPE Meeting, p. 756 (1998), carbon foam is produced from mesophase pitch followed by oxidative thermosetting and carbonization to 900° C. The foam has an open-cell structure of interconnected cells with varying shapes and with cell sizes ranging from 39 to greater than 480 microns.

Rogers et al., in Proceedings of the 45$^{th}$ SAMPE Conference, p. 293 (2000), describe the preparation of carbon foams from coal-based precursors by heat treatment under high pressure to produce materials with densities of 0.35-0.45 g/cm$^3$ with compressive strengths of 2000-3000 psi (thus a strength/density ratio of about 6000 psi/(g/cm$^3$)). These foams have an open-cell structure of interconnected cells with cell sizes up to 1000 microns. Unlike the mesophase pitch foams described above, the coal-based foams are not highly graphitizable. In a recent publication, the properties of this type of foam are described (High Performance Composites, September 2004, p. 25). The foam has a compressive strength of 800 psi at a density of 0.27 g/cm$^3$ or a strength-to-density ratio of 3000 psi/(g/cm$^3$).

Stiller et al. (U.S. Pat. No. 5,888,469) describe production of carbon foam by pressure heat treatment of a hydrotreated coal extract. These materials are claimed to have high compressive strengths of 600 psi for densities of 0.2-0.4 g/cm$^3$ (strength/density ratio of 1500-3000 psi/(g/cm$^3$)). It is suggested that these foams are stronger than those having a glassy carbon or vitreous nature that are not graphitizable.

Carbon foams can also be produced by direct carbonization of polymers or polymer precursor blends. Mitchell, in U.S. Pat. No. 3,302,999, discusses preparing carbon foams by heating a polyurethane foam at 200-255° C. in air followed by carbonization in an inert atmosphere at 900° C. These foams have densities of 0.085-0.387 g/cm$^3$ and compressive strengths of 130 to 2040 psi (ratio of strength/density of 1529-5271 psi/(g/cm$^3$)).

In U.S. Pat. No. 5,945,084, Droege describes the preparation of open-celled carbon foams by heat treating organic gels derived from hydroxylated benzenes and aldehydes (phenolic resin precursors). The foams have densities of 0.3-0.9 g/cm$^3$ and are composed of small mesopores with a size range of 2 to 50 nm.

Mercuri et al. (Proceedings of the 9$^{th}$ Carbon Conference, p. 206 (1969)) prepare carbon foams by pyrolysis of phenolic resins. For foams with a density range of 0.1-0.4 gm/cm$^3$, the compressive strength-to-density ratios are from 2380-6611 psi/(g/cm$^3$). The cells are ellipsoidal in shape with cell sizes of 25-75 microns for a carbon foam with a density of 0.25 g/cm$^3$.

Stankiewicz (U.S. Pat. No. 6,103,149) prepares carbon foams with a controlled aspect ratio range of 0.6-1.2. The patentee points out that users often require a completely isotropic foam for superior properties with an aspect ratio of 1.0 being ideal. An open-cell carbon foam is produced by impregnation of a polyurethane foam with a carbonizable resin followed by thermal curing and carbonization. The cell aspect ratio of the original polyurethane foam is thus changed from 1.3-1.4 to 0.6-1.2.

Unfortunately, carbon foams produced by the prior art processes are not effective certain applications where high thermal and electrical conductivities as well as a high compressive strength are required to maintain the structural integrity of the carbon foam. Generally, the most economical and convenient method of producing carbon foam is to directly carbonize a precursor foam derived from either phenolic or polyurethane resin. These resins are known to produce a non-graphitizable, glassy carbon, which have much lower thermal and electrical conductivities. Thus, these carbon foam structures are suitable for applications such as thermal insulation and composite tooling but not for commercial applications where higher conductivities and compressive strength are desirable.

What is desired, therefore, is a reinforced resin-derived carbon foam which is monolithic and has a controllable cell structure, where the cell structure, strength and strength-to-density ratio make the foam suitable for use in composite tooling, heat and electrical conductors, batteries and fuel cell components, aerospace components, satellite structures, cores used in sandwich structures, and also in high-temperature insulation and construction as well as in other high temperature and/or high strength applications. Indeed, a combination of characteristics, including improved conductivities and strength-to-density ratios higher than those contemplated in the prior art, have been found to be necessary for use of a carbon foam in high temperature and strength applications. Also desired is a process for preparing such foams.

SUMMARY OF THE INVENTION

The present invention provides a carbon foam which exhibits improved conductivities, thermal and electrical conductivity, density, compressive strength and compressive strength-to-density ratio to provide a combination of strength, conductivity and relatively light weight characteristics not heretofore seen. In addition, the monolithic nature and bimodal cell structure of the foam, with a combination of larger and smaller cells, which are relatively spherical, provide a carbon foam which can be produced in a desired block size and configuration and which can be readily machined.

More particularly, the inventive carbon foam has a density of about 0.03 to about 0.6 gram per cubic centimeter ($g/cm^3$), with a compressive strength of at least about 2000 pounds per square inch (psi) (measured by, for instance, the ASTM C695 method). An important characteristic for the foam when intended for use in a high temperature application is the ratio of strength to density. For such applications, a ratio of compressive strength to density of at least about 7000 $psi/(g/cm^3)$ is required, more preferably at least about 8000 $psi/(g/cm^3)$.

The inventive carbon foam should have a relatively uniform distribution of cells in order to provide the required high compressive strength. In addition, the cells should be relatively isotropic, by which is meant that the cells are relatively spherical, meaning that the cells have, on average, an aspect ratio of between about 1.0 (which represents a perfect spherical geometry) and about 1.5. The aspect ratio is determined by dividing the longer dimension of any cell with its shorter dimension.

The foam should have a total porosity of about 50% to about 95%, more preferably about 60% to about 95%. In addition, it has been found highly advantageous to have a bimodal cell size distribution, that is, a combination of two average cell sizes, with the primary fraction being the larger size cells and a minor fraction of smaller size cells. Preferably, of the cells, at least about 90% of the cell volume, more preferably at least about 95% of the cell volume should be the larger size fraction, and at least about 1% of the cell volume, more preferably from about 2% to about 10% of the cell volume, should be the smaller size fraction.

The larger cell fraction of the bimodal cell size distribution in the inventive carbon foam should be about 10 to about 150 microns in diameter, more preferably about 15 to about 95 microns in diameter, most preferably about 25 to about 95 microns in diameter. The smaller fraction of cells should comprise cells that have a diameter of about 0.8 to about 3.5 microns, more preferably about 1 to about 2 microns. The bimodal cell-structure nature of the inventive foams provide an intermediate structure between open-cell foams and closed-cell foams, thus limiting the fluid permeability of the foam while maintaining a foam structure. Indeed, advantageously, the inventive carbon foams should exhibit a nitrogen gas permeability of no greater than about 3.0 darcys, more preferably no greater than about 2.0 darcys (as measured, for instance, by the ASTM C577 method).

Advantageously, to produce the inventive foams, a polymeric foam block, particularly a phenolic foam block, is carbonized in an inert or air-excluded atmosphere, at temperatures which can range from about 500° C., more preferably at least about 800° C., up to about 3200° C. to prepare carbon foams useful in high temperature applications.

An object of the invention is to provide a reinforced carbon foam having improved conductivities and strength characteristics which enable it to be employed for commercial applications where a higher thermal conductivity and electrical conductivity are desired as well as a greater compressive strength.

Another object of the invention, therefore, is a monolithic carbon foam having characteristics which enable it to be employed in high temperature applications such as composite tooling, core materials for sandwich panels and high-temperature furnace construction.

Yet another object of the invention is a carbon foam having improved graphitizability, density, compressive strength and ratio of compressive strength to density sufficient for high temperature applications.

Still another object of the invention is a carbon foam having a porosity and cell structure and size distribution to provide utility in applications where highly connected porosity is undesirable.

Yet another object of the invention is a carbon foam which can be produced in a desired block size and configuration, and which can be readily machined or joined to provide larger carbon foam structures.

Another object of the invention is to provide a method of producing the inventive carbon foam.

These aspects and others that will become apparent to the artisan upon review of the following description can be accomplished by providing a carbon foam article produced using a resin-derived foam, such as a phenolic resol, formed by polymerization in the presence of carbon fibers, single and multi-walled and phenolic micro-balloons, selected to improve the conductivity and/or the strength of the finished carbon foam. The precursor polymeric foam can also include graphitization promoting additives to increase the thermal and electrical conductivities of the final carbon foam product as well as oxidation-protective additives to reduce the foam's rate of oxidation.

The inventive carbon foam has a ratio of compressive strength to density of at least about 7000 $psi/(g/cm^3)$, especially a ratio of compressive strength to density of at least about 8000 $psi/(g/cm^3)$. The inventive foam product advantageously has a density of from about 0.03 to about 0.6 $g/cm^3$ and a compressive strength of at least about 2000 psi, and a porosity of between about 50% and about 95%. The cells of the carbon foam have, on average, an aspect ratio of between about 1.0 and about 1.5.

Preferably, at least about 90% of the cell volume is composed of the cells having a diameter of between about 10 and about 150 microns; indeed, most preferably, at least about 95% of the cell volume is composed of the cells having a diameter of between about 25 and about 95 microns. Advantageously, at least about 1% of the cell volume is composed of the cells having a diameter of between about 0.8 and about 3.5 microns, more preferably, from about 2% to about 10% of the cell volume is composed of the cells having a diameter of about 1 to about 2 microns.

The inventive foam can be produced by carbonizing a polymeric foam article, especially a phenolic foam, in an inert or air-excluded atmosphere. The phenolic foam should preferably have a compressive strength of at least about 100 psi.

It is to be understood that both the foregoing general description and the following detailed description provide embodiments of the invention and are intended to provide an overview or framework of understanding to nature and character of the invention as it is claimed.

DETAILED DESCRIPTION OF THE PREFERRED EMBODIMENTS

Carbon foams in accordance with the present invention are prepared from polymeric foams, such as polyurethane foams or phenolic foams, with phenolic foams being preferred. Phenolic resins are a large family of polymers and oligomers, composed of a wide variety of structures based on the reaction products of phenols with aldehydes. Phenolic resins are prepared by the reaction of phenol or substituted phenol with an aldehyde, especially formaldehyde, in the presence of an acidic or basic catalyst. Phenolic resin foam is a cured system composed of open and closed cells. The resins are generally aqueous resol catalyzed by sodium hydroxide at a formaldehyde-to-phenol ratio which can vary, but is preferably about 2:1. Free phenol and formaldehyde contents should be low, although urea may be used as a formaldehyde scavenger.

The foam is prepared by adjusting the water content of the resin and by adding a surfactant (e.g., an ethoxylated non-ionic), a blowing agent (e.g., pentane, methylene chloride, or chlorofluorocarbon), and a catalyst (e.g., toluenesulfonic acid or phenolsulfonic acid). The sulfonic acid catalyzes the reaction, while the exotherm causes the blowing agent, emulsified in the resin, to evaporate and hence expand the foam. The surfactant controls the cell size as well as the ratio of open-to-closed cell units. Both batch and continuous processes are employed. In the continuous process, the machinery is similar to that used for continuous polyurethane foam. The properties of the foam depend mainly on density and the cell structure.

The preferred phenol is resorcinol; however, other phenols of similar kind that are able to form condensation products with aldehydes can also be used. Such phenols include monohydric and polyhydric phenols, pyrocatechol, hydroquinone, alkyl-substituted phenols, such as, for example, cresols or xylenols, polynuclear monohydric or polyhydric phenols, such as, for example, naphthols, p.p'-dihydroxydiphenyl dimethyl methane or hydroxyanthracenes.

The phenols used to make the foam starting material can also be used in admixture with non-phenolic precursors that are able to react with aldehydes in the same way as phenol.

The preferred aldehyde for use in the solution is formaldehyde. Other suitable aldehydes include those that will react with phenols in the same manner. These include, for example, acetaldehyde and benzaldehyde.

In general, the phenols and aldehydes that can be used in the process of the invention are those described in U.S. Pat. Nos. 3,960,761 and 5,047,225, the disclosures of which are incorporated herein by reference.

In order to create a reinforced resin-derived carbon foam with improved strength and/or graphitic properties, the carbon foam should be prepared with carbon fibers, carbon nanotubes and carbonized phenolic micro-balloons, incorporated throughout the foam's structure. The particular type of carbon fibers determines the resulting improvement of the carbon foam as carbon fibers derived from PAN, isotropic pitch, and mesophase pitch improve the strength characteristics of the carbon foam while fibers derived solely from mesophase pitch increase the foam's electrical and thermal conductivities. When carbon nanotubes are the selected type of carbon fiber for incorporation into the foam, both the strength and conductive properties of the foam are improved. Additionally, the graphitic properties of reinforced carbon foam are increased because of the physical incorporation of the carbon fibers. The individual carbon fiber filaments physically enhance the graphitizability of the precursor phenolic resins through stress-induced graphitization resulting in a more graphitic carbon foam end product.

The preferred method for creating reinforced phenolic-derived carbon foam is by incorporating carbon fibers into the initial liquid resol resin. Optimally, the liquid resol resin will have a water content of about 10% to about 30% by weight and the carbon fibers will have a length of about 0.1 inch to about 1.0 inch. Typically, the carbon fibers are added to the liquid resol resin in carbon fiber bundles under room temperature conditions. Each bundle consists of approximately 2,000 to 30,000 individual carbon fiber filaments held together in the tow form with a polymer resin or a sizing agent. The carbon fiber filaments are typically, either mesophase pitch carbon fibers, isotropic pitch carbon fibers, carbonized rayon fibers, cotton fibers, polyacrylonitrile (PAN) carbon fibers, cellulose fibers, carbon nanofibers, carbon nanotubes, or a combination of the aforementioned fibers. Phenolic microballoons either in the natural or carbonized state can also be employed as a reinforcing additive. For the most effective reinforcement and the greatest uniformity in properties of the carbon foam, the carbon fiber bundles need to be separated into individual filaments and dispersed throughout the carbon foam's structure. Optimally, the resin used in holding the carbon fiber bundles is water soluble and will readily dissolve upon addition to the liquid resol resin, allowing for the dispersion of individual carbon fiber filaments.

The carbon fiber bundles adhered with a water-soluble resin, can be added from about 0.5% to about 10% by weight to the liquid resol phenolic resin. This percentage range will optimally increase the strength and graphitic properties of the foam while not substantially reducing the inherent desirable properties of phenolic resin-derived carbon foam. Upon addition of the carbon fiber bundles to the liquid resol resin, the individual carbon fiber filaments will disperse throughout the resin and provide an ideal carbon fiber-resin mixture for the subsequent foaming process. Through foaming the phenolic resin, the carbon fiber will become uniformly dispersed and fixed in a specific spatial orientation within the phenolic foam product. During the carbonization of the phenolic foam, the carbon fiber filaments will aid in the stress orientation of the carbon foam ligaments, leading to an improved graphitizability and ultimately higher thermal and electrical conductivities. Also, the carbon fiber filaments will act as reinforcing agents to the solid carbon fraction of the foam and act as a conductive filler within the carbon foam.

In another embodiment, various additives can be added with the carbon fiber bundles to the initial liquid resol resin to achieve supplementary improvements. Additional additives for improving electrical and thermal conductivities include natural graphite flakes, graphitized powders and metal powders. Furthermore, oxidation-protective additives can also be added along with the carbon fiber bundles into the initial resol resin. The oxidation-protective additives include both polycarbosilane and silicon-nitrogen-containing polymers that will decompose at elevated temperatures into silicon carbide and silicon nitride. The above additives impart oxidation resistance to carbon foam, improving the performance of the carbon foam while minimally affecting the carbon foam's desired characteristics.

The polymeric foam precursor prepared as described above, that is used as the starting material in the production of the inventive carbon foam, should have an initial density that mirrors the desired final density for the carbon foam to be formed. In other words, the polymeric foam should have a density of about 0.03 to about 0.8 $g/cm^3$, more preferably about 0.03 to about 0.6 $g/cm^3$. The cell structure of the polymeric foam should be closed with a porosity of between about 50% and about 95% and a relatively high compressive strength, i.e., on the order of at least about 100 psi, and as high as about 300 psi or higher.

In order to convert the polymeric foam to carbon foam, the foam is carbonized by heating to a temperature of from about 500° C., more preferably at least about 800° C., up to about 3200° C., in an inert or air-excluded atmosphere, such as in the presence of nitrogen. The heating rate should be controlled such that the polymeric foam is brought to the desired temperature over a period of several days, since the polymeric foam can shrink by as much as about 50% or more during carbonization. Care should be taken to ensure uniform heating of the polymeric foam piece for effective carbonization.

By the use of a polymeric foam heated in an inert or air-excluded environment, a non-graphitizable carbon foam is obtained, which has the approximate density of the starting polymeric foam, but a compressive strength of at least about 2000 psi and, significantly, a ratio of strength to density of at least about 7000 psi/(g/cm$^3$), more preferably at least about 8000 psi/(g/cm$^3$). The carbon foam has a relatively uniform distribution of isotropic cells having, on average, an aspect ratio of between about 1.0 and about 1.5.

The resulting carbon foam has a total porosity of about 50% to about 95%, more preferably about 60% to about 95% with a bimodal cell size distribution; at least about 90%, more preferably at least about 95%, of the cell volume is composed of the cells of about 10 to about 150 microns in diameter, more preferably about 15 to about 95 microns in diameter, most preferably about 25 to about 95 microns in diameter, while at least about 1%, more preferably about 2% to about 10%, of the cell volume is composed of the cells of about 0.8 to about 3.5 microns, more preferably about 1 to about 2 microns, in diameter. The bimodal cell-structure nature of the inventive foam provides an intermediate structure between open-cell foams and closed-cell foams, limiting the fluid permeability of the foam while maintaining a foam structure. Nitrogen gas permeabilities less than 3.0 darcys, even less than 2.0 darcys, are preferred.

Typically, characteristics such as porosity and individual cell size and shape are measured optically, such as by the use of an optical microscopy using bright field illumination, and are determined using commercially available software, such as Image-Pro Software available from MediaCybernetic of Silver Springs, Md.

The cell structure of the foam is unique as compared to other foams in that it is intermediate to a closed cell and open cell configuration. The large cells appear to be only weakly connected to each other and connected by the fine porosity so that the foam exhibits permeability in the presence of water but does not readily absorb more viscous liquids.

Accordingly, by the practice of the present invention, carbon foams having heretofore unrecognized characteristics are prepared. These foams exhibit graphitizability as well as high compressive strength to density ratios and have a distinctive bimodal cell structure, making them uniquely effective at applications, such as composite tooling applications, core materials for sandwich panels and high-temperature furnace construction.

The disclosures of all cited patents and publications referred to in this application are incorporated herein by reference.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A reinforced carbon foam comprising carbon fiber filaments dispersed throughout the carbon foam, the carbon foam formed from a phenolic precursor, the foam having a pore distribution such that at least about 90% of the pore volume of the pores have a diameter of between about 10 and about 95 microns and at least about 1% of the pore volume of the pores have a diameter of between about 0.8 and about 3.5 microns, wherein the carbon foam has a liquid permeability of no greater than about 3.0 darcys.

2. The foam of claim 1 further wherein the carbon fiber filaments provide an improved parallel alignment of the carbon foam's graphitic structure along the ligaments of the carbon foam.

3. The foam of claim 1 wherein the carbon fiber filaments have a length of from about 0.1 inches to about 1.0 inches.

4. The foam of claim 1 wherein each carbon fiber filament has a diameter of from about 5 microns to about 20 microns.

5. The foam of claim 1 wherein each carbon fiber filament has a tensile strength of from about 100,000 psi to about 600,000 psi.

6. The foam of claim 1 wherein each carbon fiber filament has a Young's modulus of from about 10,000,000 psi to about 100,000,000 psi.

7. The foam of claim 1 wherein the carbon fiber filaments are selected from the group consisting of mesophase pitch carbon fibers, isotropic pitch carbon fibers, carbonized rayon fibers, cotton fibers, polyacrylonitrile (PAN) carbon fibers, cellulose fibers, carbon nanofibers, carbon nanotubes, and combinations thereof.

8. The foam of claim 1 further comprising carbonized phenolic microballoons dispersed throughout the carbon foam.

* * * * *